United States Patent
Ramaiah et al.

(10) Patent No.: US 7,472,416 B2
(45) Date of Patent: Dec. 30, 2008

(54) PREVENTING NETWORK RESET DENIAL OF SERVICE ATTACKS USING EMBEDDED AUTHENTICATION INFORMATION

(75) Inventors: Anantha Ramaiah, Sunnyvale, CA (US); Shrirang Bage, Fremont, CA (US); Amol Khare, Sunnyvale, CA (US); Mitesh Dalal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 10/842,015

(22) Filed: May 6, 2004

(65) Prior Publication Data
US 2005/0216954 A1   Sep. 29, 2005

(51) Int. Cl.
*G06F 11/00* (2006.01)
(52) U.S. Cl. .......................... 726/22; 726/23
(58) Field of Classification Search ................ 726/2–3, 726/11–13, 22–23; 709/224–225; 713/150–154
See application file for complete search history.

(56) References Cited

U.S. PATENT DOCUMENTS

| | | | |
|---|---|---|---|
| 6,751,668 B1 | 6/2004 | Lin et al. | |
| 6,779,033 B1* | 8/2004 | Watson et al. | 709/227 |
| 7,013,482 B1 | 3/2006 | Krumel et al. | |
| 7,069,438 B2* | 6/2006 | Balabine et al. | 713/168 |
| 7,076,555 B1* | 7/2006 | Orman et al. | 709/227 |
| 7,275,093 B1 | 9/2007 | Freed et al. | |
| 2002/0145976 A1 | 10/2002 | Meyer et al. | |
| 2003/0140124 A1* | 7/2003 | Burns | 709/220 |
| 2003/0154399 A1 | 8/2003 | Zuk et al. | |
| 2003/0191844 A1 | 10/2003 | Meyer et al. | |
| 2004/0006643 A1* | 1/2004 | Dolson et al. | 709/246 |
| 2004/0052234 A1 | 3/2004 | Ameigeiras et al. | |
| 2005/0021999 A1* | 1/2005 | Touitou et al. | 713/200 |
| 2006/0253603 A1* | 11/2006 | Clark et al. | 709/237 |

OTHER PUBLICATIONS

S. Bellovin, Defending Against Sequence Number Attacks May 1996, Network Working Group, Request for Comments: 1948.*
Stewart, R., "Transmission Control Protocol security considerations draft-ietf-tcpm-tcpsecure-00.txt", Network Working Group (Draft, 2004); pp. 1-10.
"Transmission Control Protocol", *Information Sciences Institute* (1981), 89 pages.
"Notification of Transmittal of the International Search Report and the Written Opinion of the International Searching Authority, or the Delcaration" as received from the PCT in corresponding International application No. PCT/US05/15261.
Stewart, R. et al., "Transmission Control Protocol security considerations" Network Working Group, IETF, draft-ietf-tcpm-tcpsecure-00, Apr. 19, 2004, 12 pages.
Appleshare, "AppleShare IP 6.3.3: How to Turn TCP Filtering On and Off", Apple, Dec. 13, 2003, Article 50832, 2 pages.
TCP/IP Guide, TCP Basic Operation: Connection Establishment, Management and Termination, printed Dec. 3, 2007, 6 pages.

* cited by examiner

*Primary Examiner*—Hosuk Song
(74) *Attorney, Agent, or Firm*—Hickman Palermo Truong & Becker LLP

(57) ABSTRACT

Approaches for preventing TCP RST attacks intended to cause denial of service in packet-switched networks are disclosed. In one approach, upon receiving a TCP RST packet, an endpoint node determines whether the TCP segment contains valid authentication information. The TCP RST segment is accepted and the TCP connection is closed only when the authentication information is valid. Authentication information may comprise a reset type values, and either initial sequence numbers of both endpoints, or a copy of a TCP header and options values previously sent by the endpoint node that is performing the authentication. Thus, attacks are thwarted because an attacker cannot know or reasonably guess the required authentication information.

25 Claims, 10 Drawing Sheets

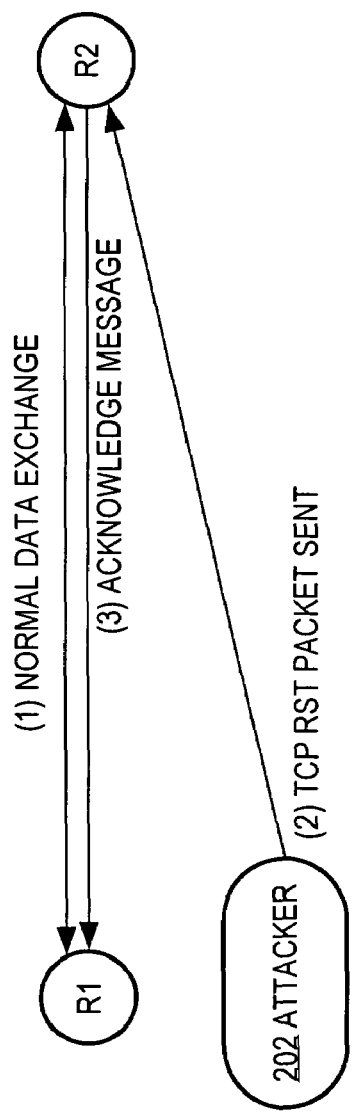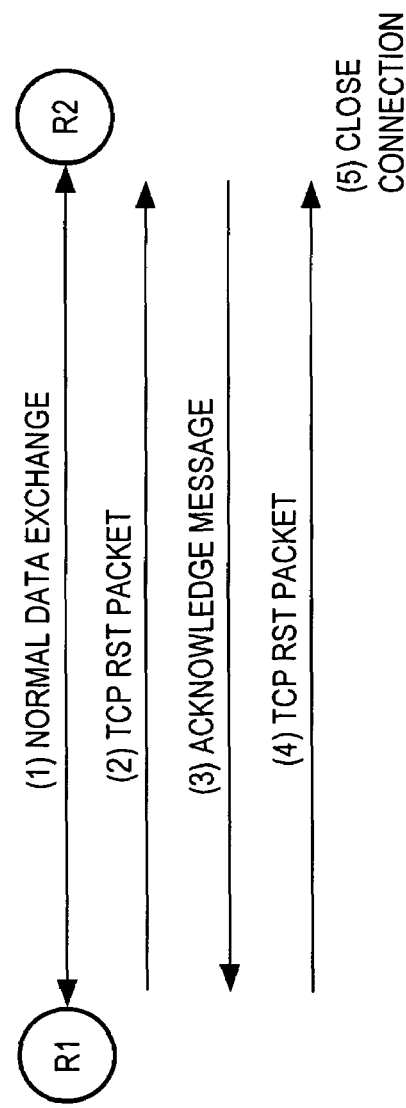

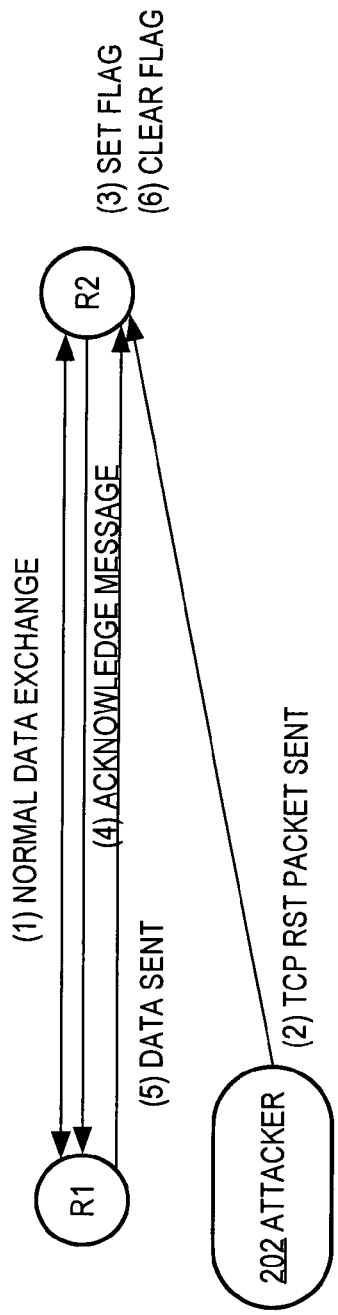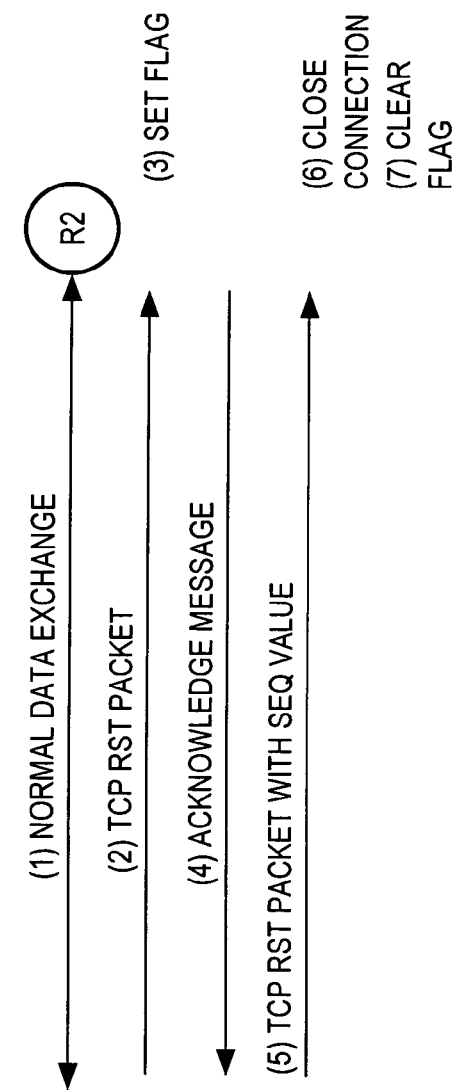
Fig. 4A
Fig. 4B

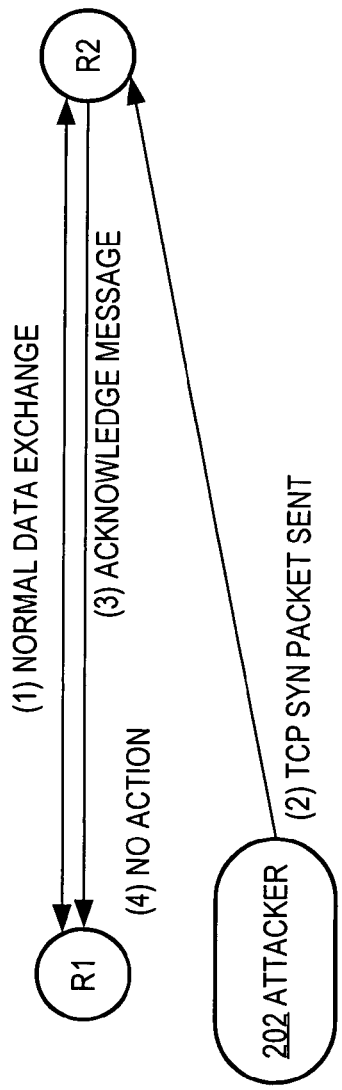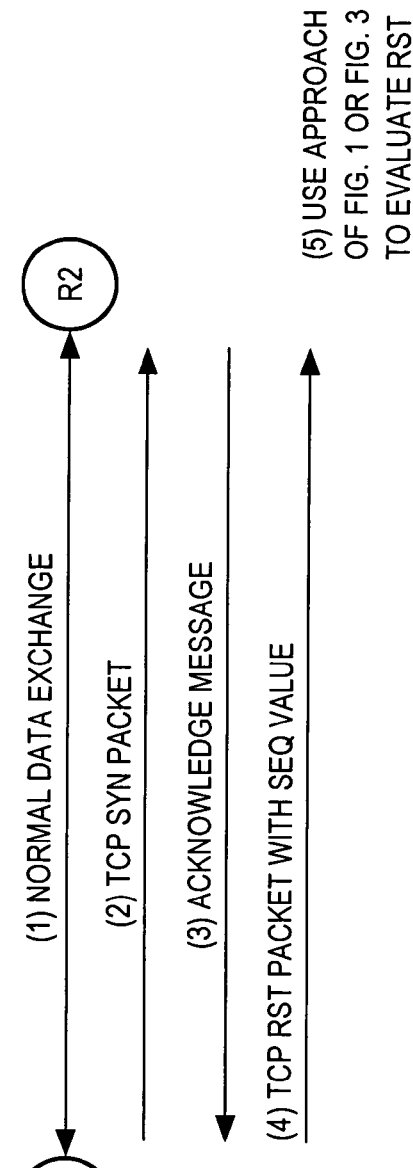

Fig. 10

| 802 SEGMENT | 806A TYPE=NOTCB | 1002 TCP HEADER | 1004 TCP OPTIONS |

PREVENTING NETWORK RESET DENIAL OF SERVICE ATTACKS USING EMBEDDED AUTHENTICATION INFORMATION

CROSS-REFERENCE TO RELATED APPLICATIONS; PRIORITY CLAIM

This application is related to application Ser. No. 10/755,146, filed Jan. 9, 2004, "Preventing Network Reset Denial of Service Attacks," of Mitesh Dalal et al., the entire contents of which are hereby incorporated by reference as if fully set forth herein.

FIELD OF THE INVENTION

The present invention generally relates to computer networks. The invention relates more specifically to preventing TCP Reset attacks in networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks have become an important tool for businesses and consumers alike, many of which are now dependent on the constant availability of network resources such as mail servers, Web sites, and content servers. As use of networks increases, protecting networks from disruption by malicious entities through denial of service ("DoS") attacks becomes more critical. DoS attacks deprive legitimate users of access to network services, and have been used successfully to disrupt legitimate user access to internet sites such as Yahoo! and CNN.

One type of DoS attack takes advantage of the basic design of the Transmission Control Protocol ("TCP"), one of the foundational protocols of the Internet, as defined in Internet Engineering Task Force (IETF) Request for Comments (RFC) 793. This type of DoS attack, known as a TCP Reset or RST attack, exploits the fact that under an implementation of TCP that is compliant with RFC 793 a TCP connection can be properly terminated in response to receiving a TCP packet from a remote node in which the Reset bit ("RST bit") in the header is set.

A TCP Reset attack seeks to shut down legitimate TCP sessions by injecting, into an active TCP connection, a spoofed segment with the Reset (RST) flag set and containing a packet sequence value that falls within a range of valid sequence values as allowed by the receiving node. Typically an attacker first determines or guesses the IP addresses of both endpoints and the port numbers that the endpoints are using for a TCP connection or higher-level protocol. A successful attacker also guesses a sequence number that falls within the allowed range or window. Sending any TCP segment with the RST flag set, correct IP addresses and port numbers with the sequence number falling within the window of the TCP connection can cause a receiving node that implements TCP properly under RFC 793 to shut down the TCP connection.

A TCP SYN attack proceeds in a similar manner. If an attacker sends a TCP packet with the SYN bit set in the header, and a sequence value that falls within a window of allowed sequence values, under RFC 793 the receiving node closes the TCP connection and sends a TCP RST packet. RFC 793 provided this process in order to enable non-synchronized hosts to close a connection and re-synchronize, but in contemporary practice the process creates security vulnerability.

Border Gateway Protocol (BGP), Hypertext Transfer Protocol (HTTP), some voice protocols, Multi-Protocol Label Switching (MPLS), and other protocols use TCP connections and are targets for these attacks. The consequences can be severe. For example, when a BGP session of a router is disrupted by closing the associated TCP connection, the router will discard all BGP routes that it has created, essentially causing a failure of the BGP process. As a result, the BGP process must re-synchronize itself with peer routers in the network, and during the re-synchronization period the failed router cannot forward any traffic. Accordingly, researchers in this field are interested in creating ways to thwart TCP Reset attacks, without fundamentally altering the operation of TCP as specified in RFC 793.

In one approach, researchers have thought that by assigning a pseudo-random 32-bit value as the Initial Sequence Number (ISN) for a new TCP connection, an attacker could not guess the correct sequence number in any practical way, because the number of potentially correct values is 232 or approximately 4 billion values, making such an attack virtually impossible. This principle may be true in the case of an attacker who attempts to inject a data segment into an existing TCP connection.

However, a conventional TCP implementation compliant with RFC 793 will accept a RST segment or SYN packet if the sequence number of the segment falls within a window or range of acceptable values, even if the sequence number is not an exact match to the next expected sequence number. This approach is used to compensate for the possibility that packets may be lost. In some implementations of TCP the range of allowed sequence values may be as large as 16,000 to more than 50,000 values. Unfortunately, a consequence is that the attacker does not need to generate all 32 bits of the sequence number correctly to provide a number that a receiving node will accept, even when a truly random or pseudo random ISN is used. If the range of allowed sequence values is sufficiently large, then the chance is greatly increased that an attacker can guess a correct sequence value through either random or brute-force selection in a practical amount of time. The larger the window established by the receiving node, the easier it is for the hacker to carry out this attack.

Thus, a TCP implementation that merely checks a newly arrived RST packet or SYN packet for an established connection to determine whether the sequence number is within a given window, and tears down the connection if so, is inadequate to prevent attack by a hacker seeking to terminate a connection prematurely.

Another approach, as used in the OpenBSD implementation of TCP under UNIX, guards against a Reset attack by requiring that the Reset packet carry a sequence number that is exactly the next expected sequence number, and not just within the expected window. If a Reset packet carries a sequence number that is not an exact match, the TCP process ignores the Reset packet and does nothing. However, this approach is considered impractical, because for a receiver more often than not the sequence number of a TCP packet is not the same as the next expected due to loss of packets. When lost packets occur in the OpenBSD approach, the receiving node is left with a connection that the sending node considers closed.

In still another approach, TCP RST "damping" is performed in which a node ignores RST packets if too many such packets arrive within a given time period. However, this approach is inadequate because even one improper RST packet may be sufficient to induce closure of a critical TCP connection.

An approach for addressing a similar attack, known as the SYN-RST attack, is provided in co-pending application Ser. No. 10/641,494, filed Aug. 14, 2003, entitled "Detecting network denial of service attacks," of Pritam Shah et al., and assigned to the same assignee hereof. The approach of Shah et al. is appropriate for an intermediate router rather than a TCP endpoint device, but does not fully address all issues described in this disclosure.

Another approach is described in co-pending application Ser. No. 10/755,146, filed Jan. 9, 2004, entitled "Preventing Network Reset Denial of Service Attacks," of Mitesh Dalal et al., and assigned to the same assignee hereof. The approach of Dalal et al. incurs one additional round-trip packet exchange to implement a challenge and response, and also injects additional segments into the network, increasing the use of valuable bandwidth. Although the approach of Dalal et al. is highly useful, an approach that does not incur another packet round-trip would be an improvement. Further, in Dalal et al., an attacker can succeed by guessing correct values for the 4-tuple of values that identifies the TCP endpoints, and a 32-bit sequence number matching the "rcvnxt" value maintained in the Transmission Control Block (TCB). Thus, a solution having additional robustness against attack would be useful to have.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a message flow diagram that illustrates TCP messages exchanged by nodes using the process of FIG. 1 when an attack is underway;

FIG. 2B is a message flow diagram that illustrates TCP messages exchanged by nodes using the process of FIG. 1 when no attack is occurring;

FIG. 4A is a message flow diagram that illustrates TCP messages exchanged by nodes using the process of FIG. 3 when an attack is underway;

FIG. 4B is a message flow diagram that illustrates TCP messages exchanged by nodes using the process of FIG. 3 when no attack is occurring;

FIG. 6A is a message flow diagram that illustrates TCP messages exchanged by nodes using the process of FIG. 5 when an attack is underway;

FIG. 6B is a message flow diagram that illustrates TCP messages exchanged by nodes using the process of FIG. 5 when no attack is occurring;

FIG. 10 is a block diagram of a TCP RST segment with authentication information, for use when an endpoint is restarting.

DETAILED DESCRIPTION

Figure 1:
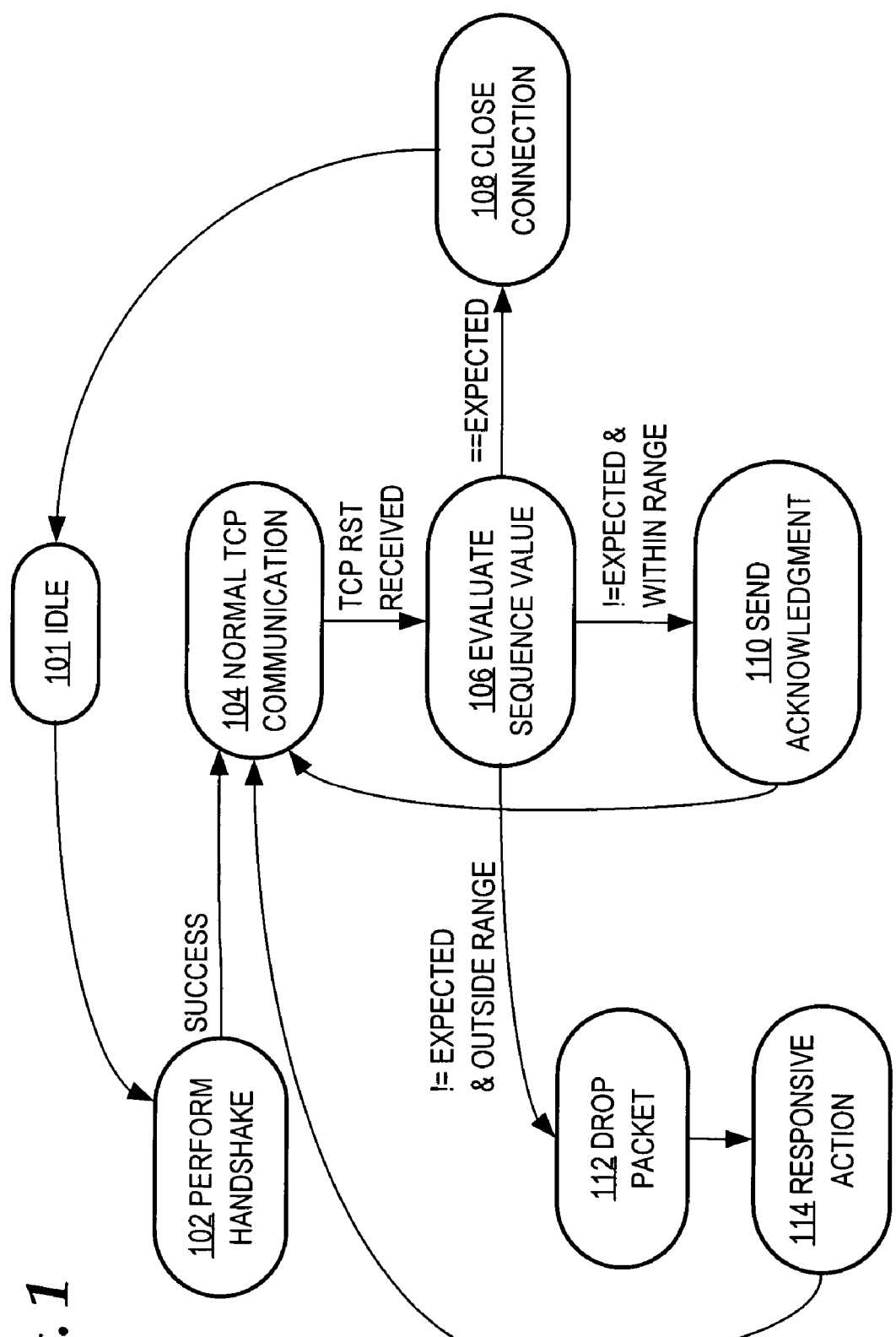
FIG. 1 is a state diagram that illustrates one embodiment of a process for preventing TCP RST attacks.

A method and apparatus for preventing network denial of service attacks is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Embodiments are described herein according to the following outline:
1.0 Overview
2.0 Approaches for Preventing TCP Denial of Service Attacks
  2.1 First Approach for Preventing TCP RST Attacks
  2.2 Second Approach for Preventing TCP RST Attacks
  2.3 Approach for Preventing TCP SYN Attacks
3.0 Using Embedded Authentication Information to Prevent TCP RST Denial of Service Attacks
4.0 Implementation Mechanisms—Hardware Overview
5.0 Extensions and Alternatives 1.0 General Overview As an introduction only, and without limiting the scope of the appended claims, the needs identified in the foregoing Background, and other needs and objects that will become apparent for the following description, are achieved in the present invention, which comprises, in one aspect, a method for preventing an attack on a network, wherein the attack comprises sending a spurious transmission control protocol (TCP) packet with a Reset (RST) bit set, the method comprising the computer-implemented steps of receiving, from a remote end node, a packet of a flow in which a RST bit of a TCP header is set; determining whether a sequence value in the packet is within a range of allowed sequence values; and when the first sequence value is within the range of allowed sequence values, sending an acknowledgment message without closing a TCP connection associated with the flow.

According to one feature of this aspect, the method further involves receiving, from the remote end node, a next packet of a flow in which the RST bit is set and comprising a second sequence value; determining whether the second sequence value is equal to an expected sequence value; and closing a TCP connection associated with the flow only when the second sequence value is equal to the expected sequence value.

In another aspect, a method of preventing an attack on a network is provided, comprising the computer-implemented steps of receiving, from a remote end node, a packet of a flow in which a RST bit of a TCP header is set; and sending an acknowledgment message without closing a TCP connection associated with the flow and without regard to whether a sequence value in the packet is within a range of allowed sequence values. The method may further involve setting a flag representing receipt of the packet with RST bit set; receiving, from the remote end node, a next packet of a flow in which the RST bit is set and comprising a sequence value; determining whether the sequence value equals an expected sequence value; and closing the TCP connection only when the sequence value equals the expected sequence value.

In yet another aspect, a method of preventing an attack on a network is provided comprising the steps of receiving, from a remote end node, a packet of a flow in which a SYN bit of a header is set; sending an acknowledgment message without closing a TCP connection associated with the flow and without regard to whether a sequence value in the packet is within a range of allowed sequence values; receiving a next packet of the flow; and when the next packet is a TCP RST packet, performing the steps of either of the other two aspects described above with respect to the next packet.

In other aspects, the invention encompasses a computer apparatus and a computer-readable medium configured to carry out the foregoing steps. Further, many other features and aspects will become apparent from the following description and from the appended claims.

In another aspect, approaches for preventing TCP RST attacks intended to cause denial of service in packet-switched networks are disclosed. In one approach, upon receiving a TCP RST packet, an endpoint node determines whether the TCP segment contains valid authentication information. The TCP RST segment is accepted and the TCP connection is closed only when the authentication information is valid. Authentication information may comprise a reset type values, and either initial sequence numbers of both endpoints, or a copy of a TCP header and options values previously sent by the endpoint node that is performing the authentication. Thus, attacks are thwarted because an attacker cannot know or reasonably guess the required authentication information.

According to one aspect, the invention provides a method of preventing an attack on a network, wherein the attack comprises sending a spurious transmission control protocol (TCP) segment with a Reset (RST) bit set, the method comprising the computer-implemented steps of receiving, from a remote end node, a TCP segment in which a RST bit is set, as part of an established TCP connection; determining whether the TCP segment contains valid authentication information; and accepting the TCP segment and closing the TCP connection only when the authentication information is valid. In one feature, the determining step comprises determining whether both a sender Initial Sequence Number (ISN) value and a receiver ISN value in a payload of the TCP segment match corresponding ISN values that are stored in a TCP Control Block (TCB) that is maintained by a receiving process. In another feature, the determining step comprises determining whether a TCP header and options values in a payload of the TCP segment match corresponding TCP header and options values that are stored in a TCP Control Block (TCB) that is maintained by a receiving process.

In still another feature, the authentication information comprises a reset type value, a sender Initial Sequence Number (ISN) value and a receiver ISN value in a payload of the TCP segment. In yet another feature, the authentication information comprises a reset type value, a TCP header and options values in a payload of the TCP segment. Further, the method may provide for determining that the authentication information is invalid or missing; and dropping the TCP segment without notifying a sending node that dropping occurred. Another feature provides the step of creating and storing a log entry indicating that a possible spoofed RST segment was received. Still another feature provides the step of generating a notification message indicating that a possible spoofed RST segment was received.

According to another feature, the invention includes determining whether a sequence value in the segment is within a range of allowed sequence values; and accepting the TCP segment and closing the TCP connection only when the authentication information is valid and when the sequence value is within the range of allowed sequence values. In a related feature, the method may include determining whether a sequence value in the segment is exactly equal to an expected segment sequence value; and accepting the TCP segment and closing the TCP connection only when the authentication information is valid and when the sequence value is equal to the expected sequence value.

2.0 Approaches for Preventing TCP Denial of Service Attacks

Two approaches for preventing TCP RST denial of service attacks, and one approach for preventing TCP SYN attacks, are presented. In a first approach for RST attacks, when a RST arrives and does not contain the next expected sequence value but the sequence value is within the correct window of data, a receiver node sends an acknowledgement but does not close the connection. If a legitimate sending node has closed the connection, the remote end node will generate a RST in reply to the acknowledgement, and near end node can properly close the connection.

A second approach operates in a similar manner, but by default all RST packets are invalid. On receipt of a RST packet, including a packet that carries the expected sequence value, the receiver node automatically sends an acknowledgement back and sets a flag indicating it has seen a RST packet. If the receiver node next receives is a RST packet with the correct sequence number, then the receiver node closes the connection. If the next segment it sees is not a RST packet, then the flag is cleared.

Accordingly, on receipt of a RST packet, a receiver node challenges the peer node in the then-current connection by means of an acknowledgement message. The peer node either responds with a RST packet as a response if the connection is genuinely closed, or the peer node takes no action if the connection remains open. The disclosed approaches provide protection from RST DOS attacks, and provide faster and more deterministic connection termination in response to receiving RST packets. The approaches are typically applied at an endpoint node for TCP connections that are in the ESTABLISHED or synchronized state as defined in RFC 793.

For TCP RST attack prevention, a node may implement only one of the approaches herein, or may implement both approaches and enable a user to select one or the other according to a perceived threat level. Generally, the second approach is more appropriate for a higher perceived threat level.

2.1 First Approach for Preventing TCP RST Attacks

A first approach for preventing TCP RST attacks is now described with reference to FIG. 1, FIG. 2A, and FIG. 2B. FIG. 1 is a state diagram that illustrates one embodiment of a process for preventing TCP RST attacks; FIG. 2A is a message flow diagram that illustrates TCP messages exchanged by nodes using the process of FIG. 1 when an attack is underway; FIG. 2B is a message flow diagram that illustrates TCP messages exchanged by nodes using the process of FIG. 1 when no attack is occurring.

The process of FIG. 1 may be implemented in one or more computer programs, sequences of instructions or other software elements that are executed by a network element acting as an endpoint in a TCP connection. For example, FIG. 1 may be implemented as part of a TCP application or feature of an operating system of a router, switch or other element of network infrastructure. In FIG. 2A and FIG. 2B, network elements or nodes R1, R2 represent endpoints in a TCP connection.

Nodes R1, R2 may comprise routers, switches, hubs, gateways, personal computers, workstations, servers, or other devices that are or can be connected to or communicate with a network. Attacker 202 is any entity that is injecting unwanted or spurious segments or packets into a TCP flow that has been established between nodes R1 and R2. Attacker 202 may comprise a workstation, personal computer, router, switch, or other processing element.

Nodes R1, R2, and Attacker 202 participate in one or more networks. Further, nodes R1, R2 and Attacker 202 may be in or accessible through a local area network (LAN), wide area network (WAN), one or more internetworks, or any other kind of network or subset thereof, in which the Transmission Control Protocol (TCP) is used to establish connections between network elements. Such a network may contain additional network infrastructure elements such as routers, switches, etc. and other end station devices such as workstations, printers, servers, etc. In one implementation, nodes R1, R2 and Attacker 202 all are communicatively coupled to a public packet-switched network such as the internet.

Nodes R1, R2 and Attacker 202 may be connected to additional network elements. The system shown in FIG. 2A, 2B is just one of many possible different configurations. Other embodiments may include fewer or more system components than those illustrated. Specifically, in a practical system there may be any number of network elements.

For purposes of describing FIG. 1, assume that R2 of FIG. 2A, FIG. 2B has implemented the process of FIG. 1; node R1 may implement the same process, or may implement TCP only as defined in RFC 793.

Initially, an element that implements FIG. 1 is in an idle state 101, which broadly represents any state of relative inactivity of a thread, process or other element that implements or embodies a TCP connection. A transition to Perform Handshake 102 occurs when a TCP SYN packet is received, without the Acknowledge (ACK) or Reset (RST) bits set, to initiate handshaking for a new connection. If handshaking is successful, a transition to Normal TCP Data Communication state 104 occurs. The details of handshaking and establishing a connection, and processing in response to unsuccessful handshaking, are not pertinent to this disclosure, but are defined in RFC 793.

At state 104, data is exchanged among the endpoint nodes. For example, nodes R1, R2 communicate data as indicated by arrow 1 in FIG. 1. A TCP connection between nodes R1, R2 is in the ESTABLISHED or synchronized state at state 104.

Upon receiving a TCP packet with the RST bit set, a transition to Evaluate Sequence Value state 106 occurs. In state 106, a sequence value carried in the TCP header is evaluated and one of several transitions occurs depending on whether the sequence value is equal to an expected next sequence value, not equal to the expected next sequence value but within a range of allowed next sequence values, or not equal to the expected next sequence value and not within the range of allowed next sequence values. A TCP packet with the RST bit set could be received from Attacker 202 in the attack scenario of FIG. 2A, as indicated by arrow 2, or from a legitimate endpoint such as R2, as shown by arrow 2 in FIG. 2B.

If the sequence value is equal to an expected next sequence value, then the TCP connection is closed, as indicated by Close Connection state 108. Because the range of all possible sequence values is $2^{32}$, an attacker is exceedingly unlikely to guess the exact expected next sequence value. Therefore, a RST packet that includes an exactly correct next sequence value is assumed to be a legitimate RST packet that requires the connection to be closed. A transition to Idle state 101 then occurs. For example, a thread or process representing the then-current TCP connection may be terminated and associated resources may be reclaimed.

If the sequence value is not equal to the expected next sequence value but within a range of allowed next sequence values, then an acknowledgment message is sent, as indicated in Send Acknowledge state 110. A TCP packet with ACK bit set in the header and carrying the next expected sequence value may be used. Sending the acknowledge message in an attack scenario is represented as arrow 3 in FIG. 2A; sending the acknowledge message in a normal scenario is shown as arrow 3 in FIG. 2B. A transition to Normal state 104 then occurs.

In effect the acknowledge message sent at state 110 acts as a challenge to the other endpoint to prove knowledge of the exact next expected sequence number if that endpoint legitimately intends to close the connection. Thus, in the attack scenario of FIG. 2A, node R1 takes no action in reply to the acknowledge message of arrow 3 because it did not originate the RST packet of arrow 2. Node R1 need not take action under RFC 793 because an unsolicited acknowledgement message may be ignored. As a result, the attack by Attacker 202 is prevented.

In contrast, in the normal scenario of FIG. 2B, node R1 issues a further RST packet at arrow 4 that will include the exact next expected sequence value that node R1 received in the ACK message of arrow 3. In response, node R1 transitions to Close Connection state 108, in which node R1 properly closes the connection.

In state 106 if the sequence value is not equal to the expected next sequence value and not within the range of allowed next sequence values, then the packet is dropped, as Drop Packet state 112 indicates. Optionally, further responsive action may be taken, as shown by Responsive Action state 114. Such responsive action may include accumulating a counter that counts spurious RST packets until a specified threshold is reached, generating a notification message to a network operations center, publishing an event on an event bus, etc.

2.2 Second Approach for Preventing TCP RST Attacks

Figure 3:
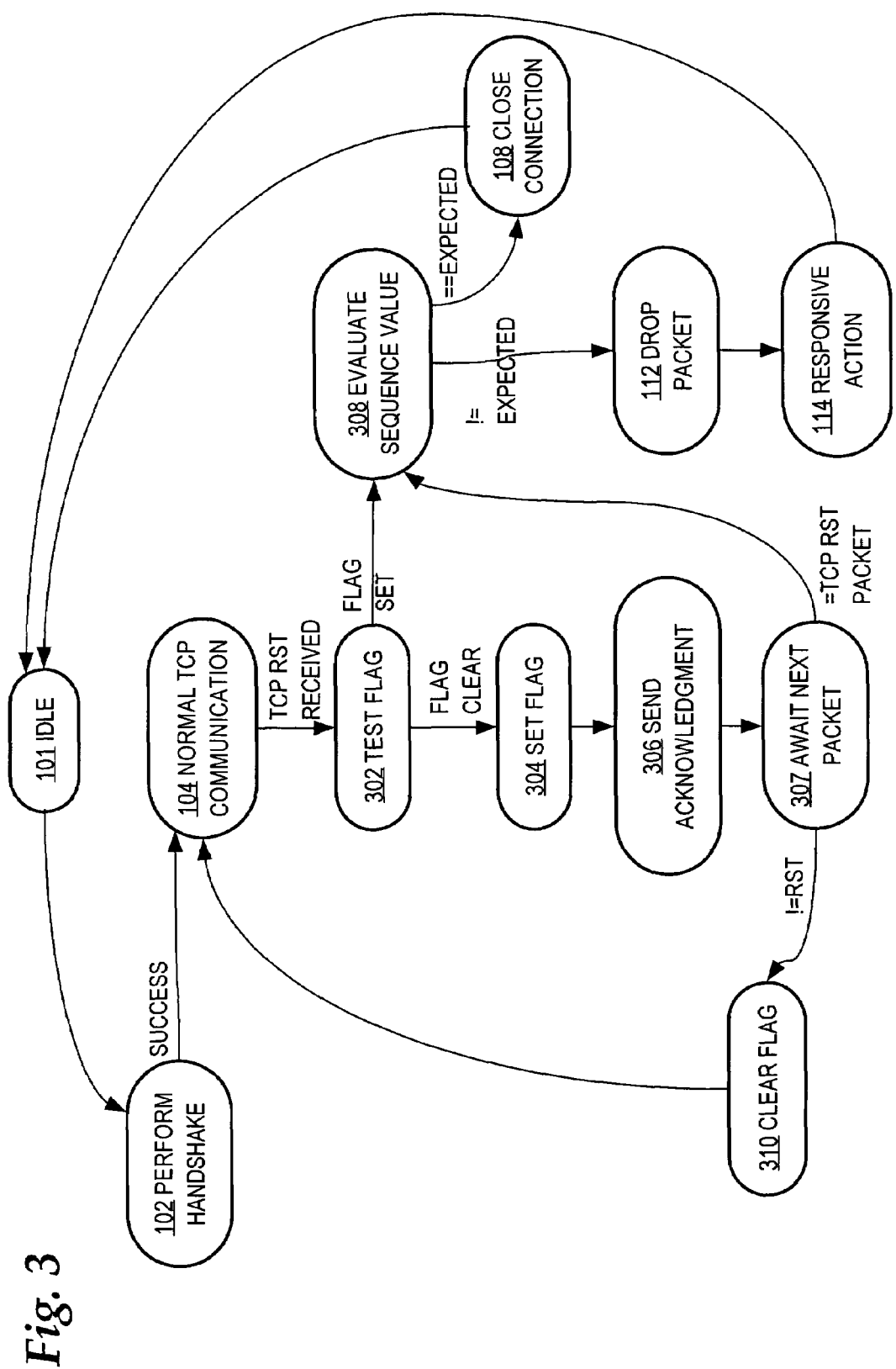
FIG. 3 is a state diagram that illustrates another embodiment of a process for preventing TCP RST attacks.

A second approach for preventing TCP RST attacks is now described with reference to FIG. 3, FIG. 4A, and FIG. 4B. FIG. 3 is a state diagram that illustrates another embodiment of a process for preventing TCP RST attacks; FIG. 4A is a message flow diagram that illustrates TCP messages exchanged by nodes using the process of FIG. 3 when an attack is underway; and FIG. 4B is a message flow diagram that illustrates TCP messages exchanged by nodes using the process of FIG. 3 when no attack is occurring.

Referring first to FIG. 3, a connection initially is in Idle state 101, and proceeds to Perform Handshake state 102 and Normal Data Communication state 104 as described above for FIG. 1. The TCP connection is in the ESTABLISHED or synchronized state. Assume that a TCP RST packet is then received. In response, a transition to Test Flag state 302 occurs, in which a flag indicating prior receipt of a RST packet is tested. If the flag is not set, then a transition to Set Flag state 304 occurs, in which the flag is set. In one embodiment, the flag is set only if the sequence value carried in the RST packet is within the range of allowed values. Alternatively, the flag is set without regard to whether the sequence value is within the allowed range.

An acknowledgement message is then sent back to the remote end node, as indicated by Send Acknowledge state 306. The acknowledgment message of state 306 is sent regardless of whether a sequence value contained in the TCP RST packet is equal to an expected next sequence value or within a window of allowed sequence values. A transition to Await Next Packet state 307 then occurs.

In Await Next Packet state 307 the process awaits receipt of the next TCP packet. If the next packet is a RST packet, then a transition to Evaluate Sequence Value state 308 occurs. The sequence value within the RST packet is examined. If the sequence value exactly matches a next expected sequence value, then the connection is closed, as shown by Close Connection state 108.

If the sequence value does not exactly match the next expected sequence value, then the packet is dropped in Drop Packet state 112, leaving the TCP connection unaffected. No consideration is given to whether the sequence value is within an allowed window because a legitimate remote end node always will reply to an acknowledge message with the expected sequence value. Optionally, in Responsive Action state 114, other responsive action may be taken, as described above with respect to FIG. 1.

If the next TCP packet received at Await Next Packet state 307 is not a RST packet or is a RST packet with an incorrect sequence number, then the flag value is cleared, as indicated in Clear Flag state 310. A transition to Normal Data Communication state 104 then occurs.

Operation of the foregoing process is now described in the context of an attack and in the context of a legitimate closing of a connection.

Referring to FIG. 4A, assume that nodes R1 and R2 have established normal TCP communication as indicated by arrow 1, and Attacker 202 then sends a spurious RST packet, as indicated by arrow 2. In response, using the process of FIG. 3, receiving endpoint node R2 sets the flag value at Set Flag state 304 and as indicated by numeral 3 of FIG. 4A. Node R2 sends an acknowledge message, as shown by arrow 4 and as indicated by Send Acknowledge state 306. Because node R1 has not closed the connection, node R1 treats the acknowledge message as an unsolicited acknowledgement that requires no response. Accordingly, node R1 continues sending data in normal TCP communication, as indicated by arrow 5. As a result, the attack by Attacker 202 is thwarted.

In the normal scenario of FIG. 4B, nodes R1 and R2 again establish normal TCP communication as indicated by arrow 1, but node R1 then closes the connection and sends a legitimate RST packet to receiving node R2. In response, node R2 sets the flag value (numeral 3) and sends an acknowledge message (arrow 4) that contains a next expected sequence value.

Because node R1 has closed the connection, node R1 responds with another RST packet that contains the expected sequence value. As a result, R2 transitions to state 308, state 108, and state 310 of FIG. 3, properly closing the connection and clearing the flag value, as indicated by numeral 6 and numeral 7 of FIG. 4B.

2.3 Approach for Preventing TCP SYN Attacks

Figure 5:
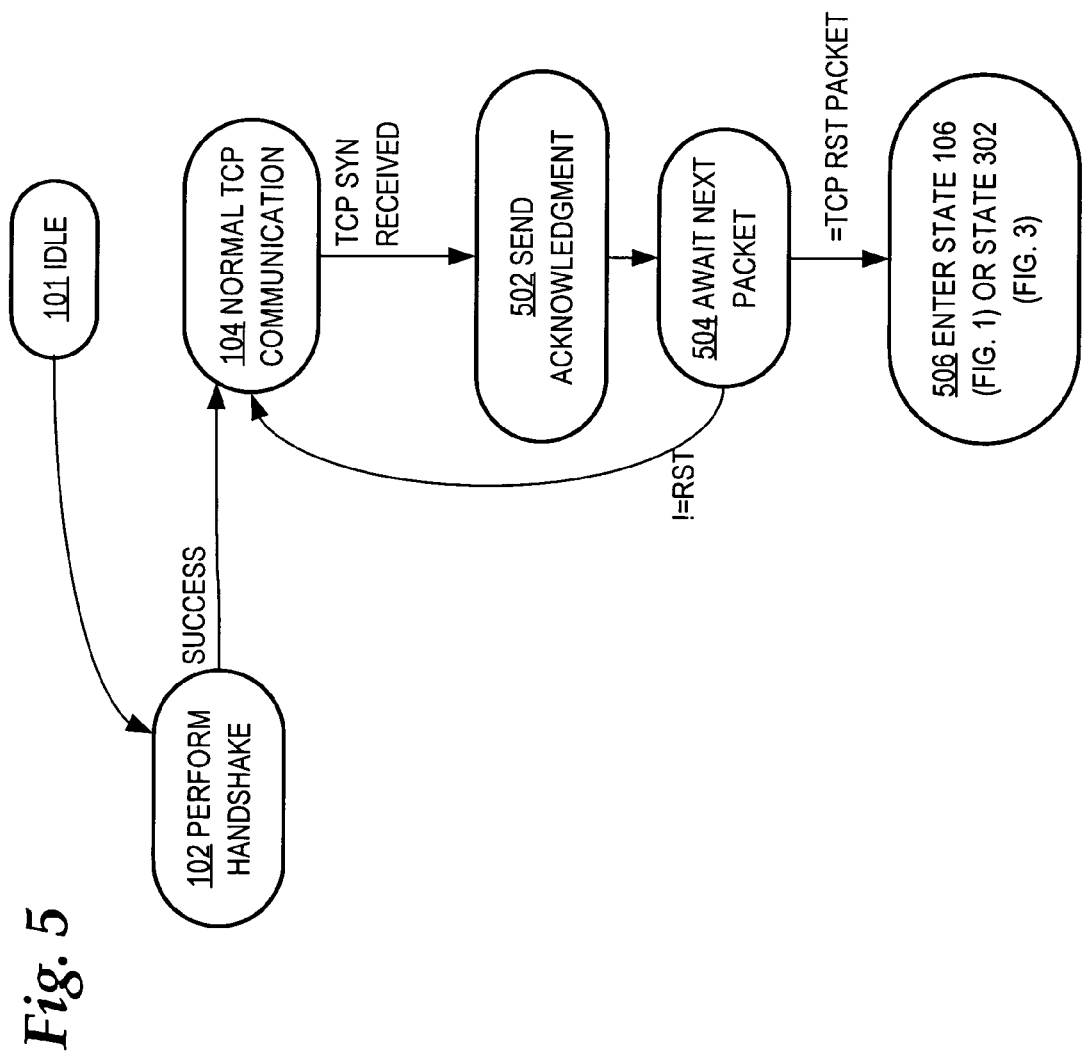
FIG. 5 is a state diagram that illustrates one embodiment of a process for preventing TCP SYN attacks.

FIG. 5 is a state diagram that illustrates one embodiment of a process for preventing TCP SYN attacks; FIG. 6A is a message flow diagram that illustrates TCP messages exchanged by nodes using the process of FIG. 5 when an attack is underway; and FIG. 6B is a message flow diagram that illustrates TCP messages exchanged by nodes using the process of FIG. 5 when no attack is occurring.

Referring first to FIG. 5, from Idle state 101 a connection is established through Perform Handshake state 102 and normal TCP communication between first and second endpoint nodes occurs at Normal Data Communication state 104. The TCP connection is in the ESTABLISHED or synchronized state. Assume that a first endpoint node then receives a TCP packet with the SYN bit set in the header. A transition occurs to Send Acknowledge state 502, in which the first endpoint node sends an acknowledge message to the second endpoint. The acknowledgment message of state 502 is sent regardless of whether a sequence value contained in the TCP SYN packet is equal to an expected next sequence value or within a window of allowed next sequence values.

In contrast, under a conventional implementation of RFC 793, receiving a TCP SYN packet causes a receiving node to send a TCP RST packet if the sequence value of the TCP SYN packet is within the window of allowed next sequence values.

A transition then occurs directly to Await Next Packet state 504, in which the first endpoint node awaits receipt of the next TCP packet.

If the next packet is not a RST packet, then a transition to Normal Data Communication state 104 occurs and no action is taken with respect to the connection. Such a transition would occur, for example, if the sending node has not closed the connection and treated the acknowledgment of state 502 as an unsolicited acknowledgment that requires no reply.

If the next packet is a RST packet, then optionally either the first approach or second approach described above for preventing RST packets is initiated. Thus, at state 506, the first endpoint node enters either state 106 of FIG. 1 or state 302 of FIG. 3. In this manner, the RST packet that was just received is subjected to the same scrutiny for attack as provided in the processes of FIG. 1 or FIG. 3. Performing such additional checks is not required, but could provide additional assurance that the RST is legitimate.

In still another alternative, the processes of FIG. 1 or FIG. 3 may be performed only if the TCP RST packet received while in state 504 contains a sequence value that is not equal to the expected next sequence value. If a TCP RST packet is received at state 504 that contains a sequence value that is equal to the expected next sequence value, then the connection may be closed, because most likely, only an endpoint node that actually closed the connection has sent such a packet.

The process of FIG. 5 may operate as follows in the attack scenario of FIG. 6A and the normal scenario of FIG. 6B. Referring first to FIG. 6A, assume that nodes R1 and R2 as TCP endpoint nodes establish normal TCP communication as shown by arrow 1. Attacker 202 then sends a spurious TCP SYN packet to node R2 as shown by arrow 2.

In response, as indicated by arrow 3 and as shown in Send Acknowledge state 502, R2 sends an acknowledge message and enters Await Next Packet state 504. Because node R1 has not closed the connection, node R1 treats the acknowledge message as an unsolicited acknowledgement that requires no response. Therefore, node R1 takes no action with respect to the connection.

At some point thereafter node R1 sends further data in TCP packets. At state 504 the node R2 determines that the next packet is not a RST packet, and therefore transitions to Normal Data Communication state 104. As a result, the attack by Attacker 202 is prevented.

In the normal scenario of FIG. 6B, nodes R1 and R2 establish a TCP connection at arrow 1 and transfer data. Node R1 then properly closes the connection and sends a TCP SYN packet as shown by arrow 2. In response, node R2 sends an acknowledge message at arrow 3 as provided by Send Acknowledge state 502, and enters Await Next Packet state 504.

Because node R1 has closed the connection, node R1 replies with a RST packet at arrow 4. In response, at state 504 node R2 determines that the next packet is an RST packet and transitions to state 506. Node R2 then evaluates the RST packet according to the approach of either FIG. 1 or FIG. 3, as indicated by numeral 5 of FIG. 6B.

Accordingly, the RST packet undergoes further evaluation to determine whether it represents an attack. Further message flows as shown in FIG. 2B, FIG. 4B are performed in which node R2 sends another acknowledge message as a challenge and node R1 replies with the correct expected sequence number. The connection is then closed properly.

3.0 Using Embedded Authentication Information to Prevent TCP RSD Denial of Service Attacks Approaches for preventing TCP RST denial of service attacks, using embedded authentication information, are now described. Approaches are provided for two cases in which RST segments typically occur. The first case arises when one TCP endpoint seeks to terminate a connection. The second case arises when an endpoint is restarting.

In both the first case and the second case, according to the approaches herein, a legitimate TCP endpoint node sends identification credentials with a TCP RST segment to enable a receiving node to authenticate the RST segment. One authentication approach uses Initial Sequence Numbers (ISN's) for a TCP connection, which are pseudo-random numbers generated by each node in a TCP connection as part of a handshake process. Both TCP hosts have knowledge of both ISNs, and can store the ISNs in the TCP Control Block (TCB), which is a basic data structure containing information about a connection. In conventional practice, a TCP RST segment does not contain any data, and sending or processing a RST segment does not increment either of the sequence numbers. In one authentication approach, the foregoing characteristics are used to advantage by embedding the send and receive ISN's of the TCP connection in a RST segment that enables TCP to authenticate the segment.

Figure 8A:
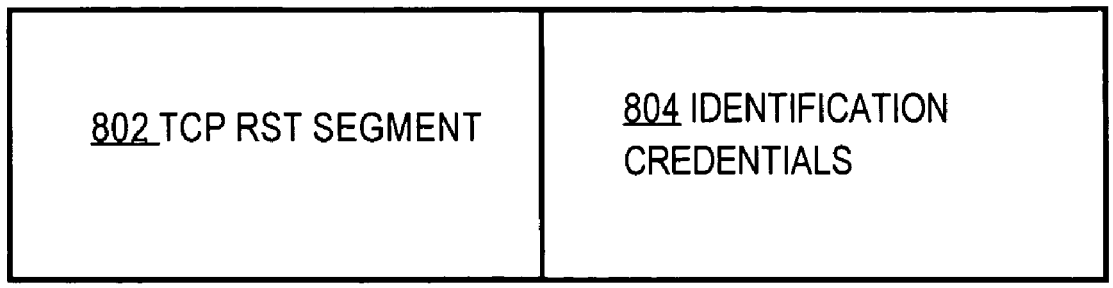
FIG. 8A is a block diagram of a TCP RST segment with authentication information, in one embodiment.

FIG. 8A is a block diagram of a TCP RST segment 802 associated with identification credentials 804. The identification credentials 804 may be carried in the payload of the TCP segment. In RFC 793, the payload of a TCP RST segment has no specified purpose and no defined fields or values. Thus, the approaches herein are backward compatible; a TCP implementation that does not implement these approaches and receives a TCP RST segment with identification credentials in the payload will simply ignore the payload.

Figure 8B:
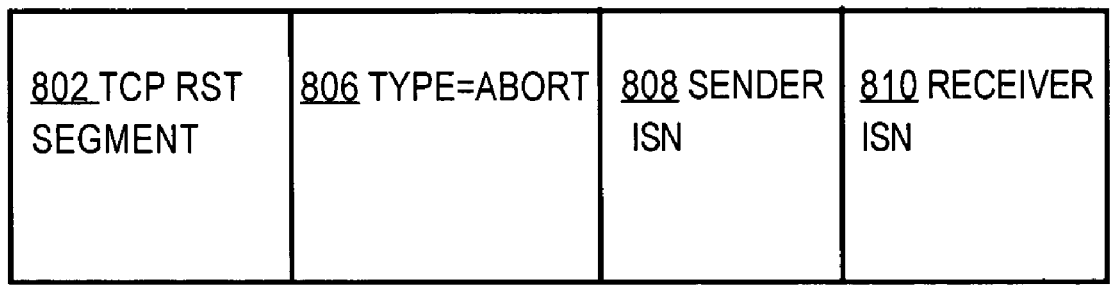
FIG. 8B is a block diagram of a TCP RST segment with authentication information, in another embodiment.

In the first case, in which a TCP endpoint node seeks to terminate or abort a connection, a legitimate node is expected to send a TCP RST segment with the sender's Initial Sequence Number (ISN) and the receiver's ISN in the RST segment payload. FIG. 8B is a block diagram of a TCP RST segment with authentication information for this case. The TCP RST segment 802 is associated with a TYPE value that requests an ABORT of the connection, a sender ISN value 808, and a receiver ISN value 810. Collectively, the TYPE value 806, sender ISN value 808, and receiver ISN value 810 correspond to identification credentials 804 of FIG. 8A. The use of a segment of the form of FIG. 8B is now described, followed by a description of a different payload and processing for the second case.

Figure 9:
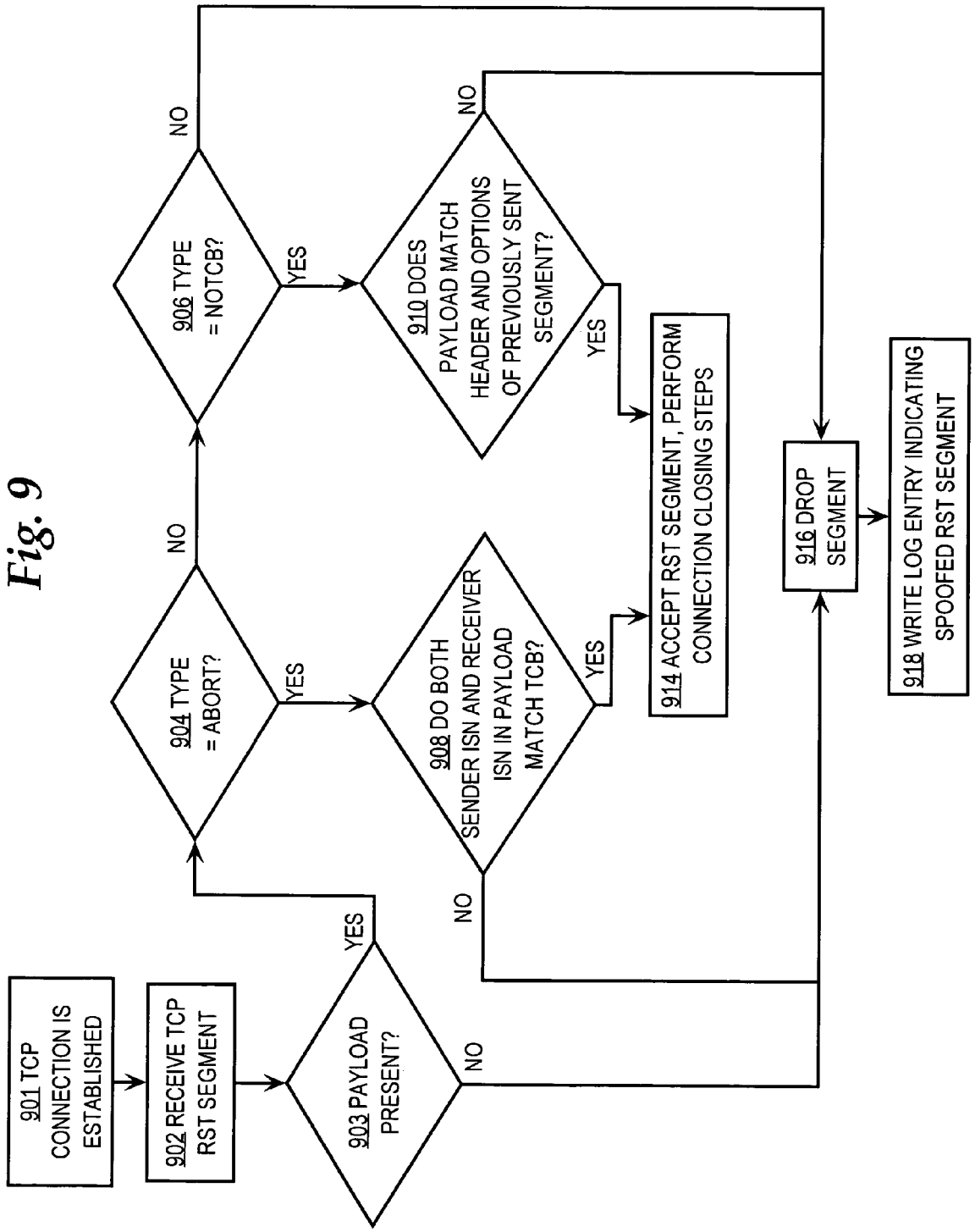
FIG. 9 is a flow diagram of an approach for preventing a TCP RST denial of service attack using embedded authentication information.

FIG. 9 is a flow diagram of a process for preventing a TCP RST denial of service attack using embedded authentication information. In step 901, a TCP connection is established. Step 901 represents performing the conventional three-way TCP handshake and any other steps that are necessary for a TCP connection between a first endpoint node and a second endpoint node to reach the ESTABLISHED state as defined in RFC 793.

In step 902, a TCP RST segment is received by one endpoint node. In step 903, a test is performed to determine whether a payload with any data is present at all in the TCP RST segment. If no payload is present, then control may pass to step 916, skipping all the other processing. In step 916, the RST segment is dropped silently, that is, without sending a message to the sending node indicating that a drop occurred.

Optionally, in step 918, a log entry is written to indicate that a spoofed RST segment was received. Additionally or alternatively, step 918 may provide the step of generating a notification message indicating that a possible spoofed RST segment was received.

Step 903 also may involve performing a threshold test or screening test to determine whether a current segment sequence number carried in the received RST segment is within the then-current allowed window of TCP sequence values. If the current segment sequence number is outside the allowed window, then the segment is dropped at step 916. In some embodiments, a test for an exact match for the sequence number is performed as part of step 903. If an exact match is not found, then the segment is dropped. While these steps are optional, it is conventional to perform them for all received TCP segments, and they further enhance the security benefits of the approaches herein.

In step 904, a test is performed to determine if a TYPE value carried in the segment indicates ABORT. In the approaches herein, two possible reset type values, TYPE=ABORT and TYPE=NOTCB, are defined as part of the payload of a TCP RST segment; in other embodiments, there may be other TYPE values for handling other cases in which RST segments are received.

If the TYPE value is ABORT, then the first case has arisen. In step 908 a test is performed to determine whether both a sender ISN value and a receiver ISN value in the payload of the TCP RST segment match corresponding values in the Transmission Control Block (TCB) maintained internally by the receiving node that is performing the process of FIG. 9. If no match is found, then the receiving node can assume that the RST segment is spoofed or erroneous. Therefore, control passes to step 916, in which the RST segment is dropped, and step 918, in which a log entry is written to indicate that a spoofed RST segment was received.

If a match is found at step 908, then the RST segment has been successfully authenticated. Therefore, in step 914, the RST segment is accepted, and the then-current TCP connection is closed according to conventional connection-closing steps.

If the TYPE value was not ABORT as tested at step 904, then in step 906, a test is performed for the TYPE value of NOTCB, which is provided by a sending endpoint node that has crashed and lost the contents of the TCB, and is in the process of restarting. Thus, TYPE=NOTCB indicates that the sender has no TCB available; however, the receiver considers the connection to be in the ESTABLISHED state. If the TYPE value is not NOTCB at step 906, then the TYPE value has an undefined or unrecognized value. In that case, control passes to step 916 in which the RST segment is dropped. In other embodiments, if other TYPE values are defined and handled, then further processing for those type values may be performed when step 906 yields a negative result.

If the test of step 906 is true, then the process of FIG. 9 expects the TCP RST segment payload to contain a copy of the TCP header and option values of a segment that was previously sent by the node that is performing the process of FIG. 9. FIG. 10 is a block diagram of a TCP RST segment with authentication information, for use when an endpoint is re-starting. Segment 802 of FIG. 10 comprises a TYPE value 806A, a TCP header field 1002, and a TCP options field 1004. TCP header field 1002 may comprise, for example, the first 20 bytes of a segment previously sent to the node that is asserting the RST segment 802.

In step 910, a test is performed to determine if the payload of the received RST segment matches the TCP header and option values of a previously sent segment. If so, then the receiving node that is performing FIG. 9 has authenticated the received RST segment, because only a legitimate receiver will have the exact TCP header and option values that the present node previously sent. Accordingly, in step 914 the RST segment is accepted and the connection is closed. Thereafter, conventional processing to handle a node restart case may be performed; for example, the TCP three-way handshake may be re-initiated.

If the test of step 910 is false, then control passes to step 916 in which the RST segment is dropped, as described above.

The foregoing approaches offer many benefits in comparison to prior practice. The approaches are easy to implement in software, and use existing random ISN values. Because ISN values typically are pseudo-random 32-bit values, the approaches are robust and secure. In addition, in the restart case, use of a copy of the TCP header to verify authenticity makes spoofing a packet nearly impossible; as a result, it is very difficult for an attacker to penetrate a TCP connection. In particular, to successfully circumvent the disclosed approaches, an attacker would have to guess all of the following, which is considered extremely difficult even for a brute-force attack: the 4-tuple of values that identify a TCP connection, including sender port, receiver port, sender IP address, and receiver IP address; a 32-bit segment sequence number that is within the allowed window of sequence values, or in some embodiments, an exact match for the sequence number; a 32-bit sender ISN; and a 32-bit receiver ISN. Further, no additional segment or packet round-trips are involved.

The security benefits provided by the approaches herein also indirectly benefit higher-level protocols and applications, such as BGP, which will suffer fewer unintended resets, crashes or attacks as a result of closing an underlying TCP connection.

Embodiments of these approaches may be implemented in any software or hardware elements that implement a TCP stack, for example, as part of an operating system of a router, switch, or other node of network infrastructure, or as part of an operating system of a personal computer, workstation, or other network end station node.

4.0 Implementation Mechanisms—Hardware Overview

Figure 7:
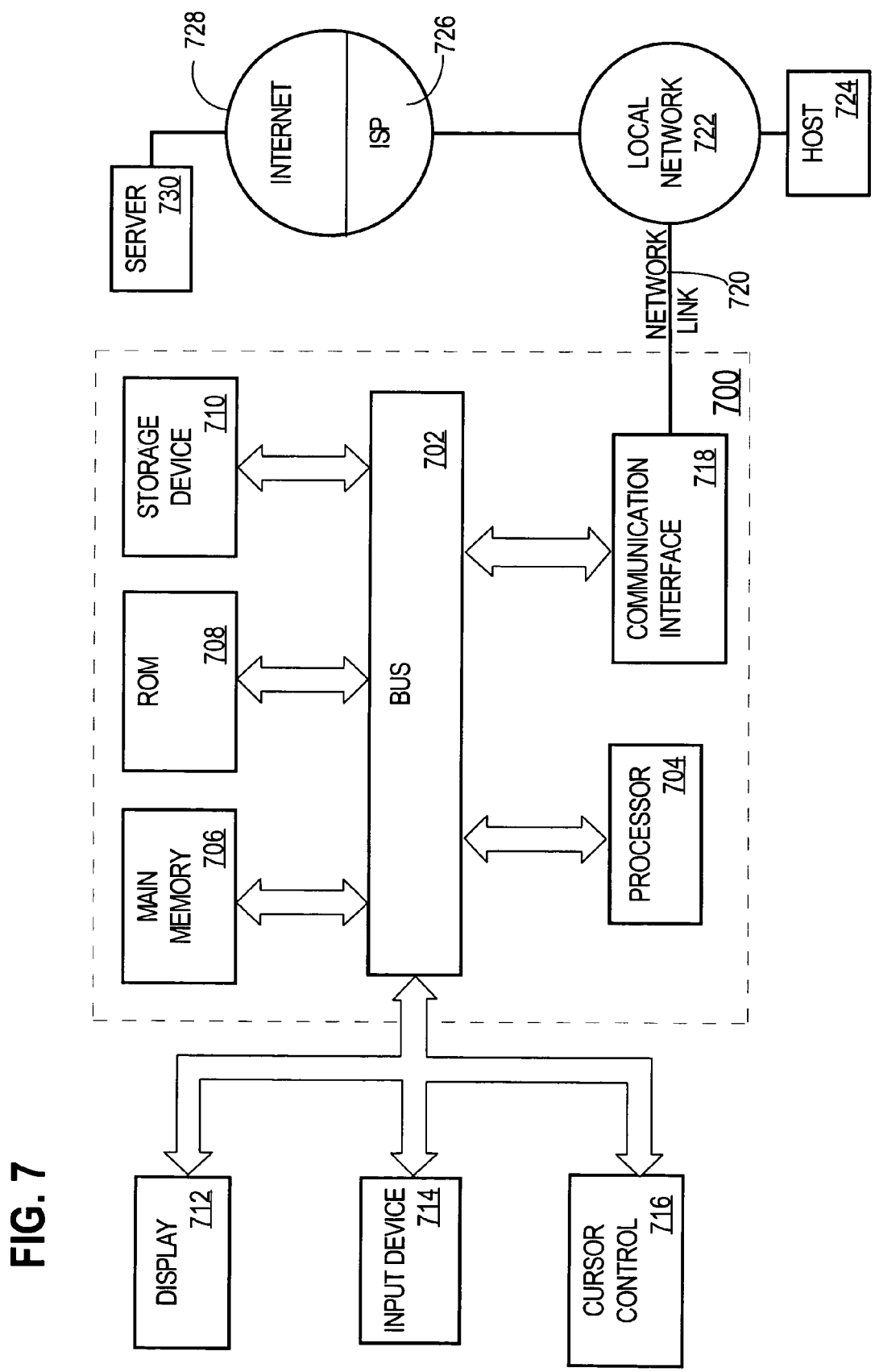
FIG. 7 is a block diagram that illustrates a computer system upon which an embodiment may be implemented.

FIG. 7 is a block diagram that illustrates a computer system 700 upon which an embodiment may be implemented. The preferred embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 714. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface 719. The destinations may include host 724, server 730, other end stations, or other routing and switching devices in local network 722 or Internet 728.

The invention is related to the use of computer system 700 for implementing the approaches herein. According to one embodiment of the invention, an implementation of the approaches herein is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for detecting RST-flood and/or SYN-RST denial of service attacks as described herein.

Processor 704 may execute the received code as it is received, and/or stored in storage device 710, or other non-volatile storage for later execution. In this manner, computer system 700 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing an attack on a network, wherein the attack comprises sending one or more spurious transmission control protocol (TCP) segments with a Reset (RST) bit set, the method comprising the computer-implemented steps of:

receiving, from a remote end node, a TCP segment in which a RST bit is set, as part of an established TCP connection;

in response to receiving the TCP segment, determining whether the TCP segment is a spurious TCP segment of the one or more spurious TCP segments by determining whether the TCP segment contains valid authentication information, wherein the authentication information is in a payload of the TCP segment;

accepting the TCP segment and closing the TCP connection only when the authentication information is valid.

2. The method as recited in claim 1, wherein the determining step comprises determining whether both a sender Initial Sequence Number (ISN) value and a receiver ISN value in the payload of the TCP Control Block (TCB) that is maintained by a receiving process.

3. The method as recited in claim 1, wherein the determining step comprises determining whether a TCP header and options values in the payload of the TCP segment match corresponding TCP header and options values that are stored in a TCP Control Block (TCB) that is maintained by a receiving process.

4. The method as recited in claim 1, wherein the authentication information comprises a reset type value, a sender Initial Sequence Number (ISN) value and a receiver ISN value in the payload of the TCP segment.

5. The method as recited in claim 1, wherein the authentication information comprises a reset type value, a TCP header and options values in the payload of the TCP segment.

6. The method as recited in any of claims 1, 2, 3, 4, or 5, further comprising the steps of:

determining that the authentication information is invalid or missing; dropping the TCP segment without notifying a sending node that dropping occurred.

7. The method as recited in claim 6, further comprising the step of creating and storing a log entry indicating that a possible spoofed RST segment was received.

8. The method as recited in claim 6, further comprising the step of generating a notification message indicating that a possible spoofed RST segment was received.

9. The method as recited in claim 1, further comprising the steps of:

determining whether a sequence value in the segment is within a range of allowed sequence values; and accepting the TCP segment and closing the TCP connection only when the authentication information is valid and when the sequence value is within the range of allowed sequence values.

10. The method as recited in claim 1, further comprising the steps of:
- determining whether a sequence value in the segment is exactly equal to an expected segment sequence value; and
- accepting the TCP segment and closing the TCP connection only when the authentication information is valid and when the sequence value is equal to the expected sequence value.

11. An apparatus for preventing an attack on a network, wherein the attack comprises sending one or more spurious transmission control protocol (TCP) segments with a Reset (RST) bit set, comprising:
- means for receiving, from a remote end node, a TCP segment in which a RST bit is set, as part of an established TCP connection;
- means for determining whether the TCP segment is a spurious TCP segment of the one or more spurious TCP segments by determining whether the TCP segment contains valid authentication information in response to receiving the TCP segment, wherein the authentication information is in a payload of the TCP segment;
- means for accepting the TCP segment and closing the TCP connection only when the authentication information is valid.

12. An apparatus for preventing an attack on a network, wherein the attack comprises sending one or more spurious transmission control protocol (TCP) segments with a Reset (RST) bit set, comprising:
- a processor;
- one or more stored sequences of instructions that are accessible to the processor and which, when executed by the processor, cause the processor to carry out the steps of:
- receiving, from a remote end node, a TCP segment in which a RST bit is set, as part of an established TCP connection;
- in response to receiving the TCP segment, determining whether the TCP segment is a spurious TCP segment of the one or more spurious TCP segments by determining whether the TCP segment contains valid authentication information, wherein the authentication information is in a payload of the TCP segment;
- accepting the TCP segment and closing the TCP connection only when the authentication information is valid.

13. A computer-readable storage medium storing one or more sequences of instructions for preventing an attack on a network, wherein the computer-readable storage medium is one of a volatile or non-volatile medium, wherein the attack comprises sending one or more spurious transmission control protocol (TCP) segments with a Reset (RST) bit set, wherein the execution of the one or more sequences of instructions by one or more processors causes the one or more processors to perform the steps of:
- receiving, from a remote end node, a TCP segment in which a RST bit is set, as part of an established TCP connection;
- in response to receiving the TCP segment, determining whether the TCP segment is a spurious TCP segment of the one or more spurious TCP segments by determining whether the TCP segment contains valid authentication information, wherein the authentication information is in a payload of the TCP segment;
- accepting the TCP segment and closing the TCP connection only when the authentication information is valid.

14. The apparatus as recited in claim 11, wherein the means for determining step comprises means for determining whether both a sender Initial Sequence Number (ISN) value and a receiver ISN value in the payload of the TCP segment match corresponding ISN values that are stored in a TCP Control Block (TCB) that is maintained by a receiving process.

15. The apparatus as recited in claim 11, wherein the means for determining step comprises means for determining whether a TCP header and options values in the payload of the TCP segment match corresponding TCP header and options values that are stored in a TCP Control Block (TCB) that is maintained by a receiving process.

16. The apparatus as recited in claim 11, wherein the authentication information comprises a reset type value, a sender Initial Sequence Number (ISN) value and a receiver ISN value in the payload of the TCP segment.

17. The apparatus as recited in claim 11, wherein the authentication information comprises a reset type value, a TCP header and options values in the payload of the TCP segment.

18. The apparatus as recited in claim 12, wherein the determining step includes determining whether both a sender Initial Sequence Number (ISN) value and a receiver ISN value in the payload of the TCP segment match corresponding ISN values that are stored in a TCP Control Block (TCB) that is maintained by a receiving process.

19. The apparatus as recited in claim 12, wherein the determining step includes determining whether a TCP header and options values in the payload of the TCP segment match corresponding TCP header and options values that are stored in a TCP Control Block (TCB) that is maintained by a receiving process.

20. The apparatus as recited in claim 12, wherein the authentication information comprises a reset type value, a sender Initial Sequence Number (ISN) value and a receiver ISN value in the payload of the TCP segment.

21. The apparatus as recited in claim 12, wherein the authentication information comprises a reset type value, a TCP header and options values in the payload of the TCP segment.

22. The computer-readable storage medium as recited in claim 13, wherein the determining step comprises determining whether both a sender Initial Sequence Number (ISN) value and a receiver ISN value in the payload of the TCP segment match corresponding ISN values that are stored in a TCP Control Block (TCB) that is maintained by a receiving process.

23. The computer-readable storage medium as recited in claim 13, wherein the determining step comprises determining whether a TCP header and options values in the payload of the TCP segment match corresponding TCP header and options values that are stored in a TCP Control Block (TCB) that is maintained by a receiving process.

24. The computer-readable storage medium as recited in claim 13, wherein the authentication information comprises a reset type value, a sender Initial Sequence Number (ISN) value and a receiver ISN value in the payload of the TCP segment.

25. The computer-readable storage medium as recited in claim 13, wherein the authentication information comprises a reset type value, a TCP header and options values in the payload of the TCP segment.

* * * * *

UNITED STATES PATENT AND TRADEMARK OFFICE
CERTIFICATE OF CORRECTION

| | | |
|---|---|---|
| PATENT NO. | : 7,472,416 B2 | Page 1 of 1 |
| APPLICATION NO. | : 10/842015 | |
| DATED | : December 30, 2008 | |
| INVENTOR(S) | : Anantha Ramaiah | |

It is certified that error appears in the above-identified patent and that said Letters Patent is hereby corrected as shown below:

Title page, item (56) References cited

Please insert under "U.S. PATENT DOCUMENTS"
--2002/0101819   A1   8/2002   Goldstone--

Title page, please insert under "OTHER PUBLICATIONS"
--Stewart, R., "Transmission Control Protocol Security Considerations," Network Working Group Internet Draft, April 19, 2004, 11 pages.
International Searching Authority, "Notification of Transmittal of the International Search Report and the Written Opinion of the International Searching Authority, or the Declaration," PCT/US05/00551, dated May 26, 2006, 7 pages.
Current Claims, PCT/US05/00551, 4 pages.--

Please insert under "Related US Application Data"

Title page, item --(63) Continuation-in-part of 10/755,146, filed on January 9, 2004, now Patent No. 7,203,961--

Column 1, line 8:
Please insert after "This application is related to" and before "application Ser. No. 10,755," --and claims domestic priority under 35 Section 120 as a Continuation-in-part of prior--

Signed and Sealed this

Seventeenth Day of February, 2009

JOHN DOLL
*Acting Director of the United States Patent and Trademark Office*